(No Model.)
J. B. BUTTERWORTH.
WATER HEATING APPARATUS.
No. 506,975. Patented Oct. 17, 1893.
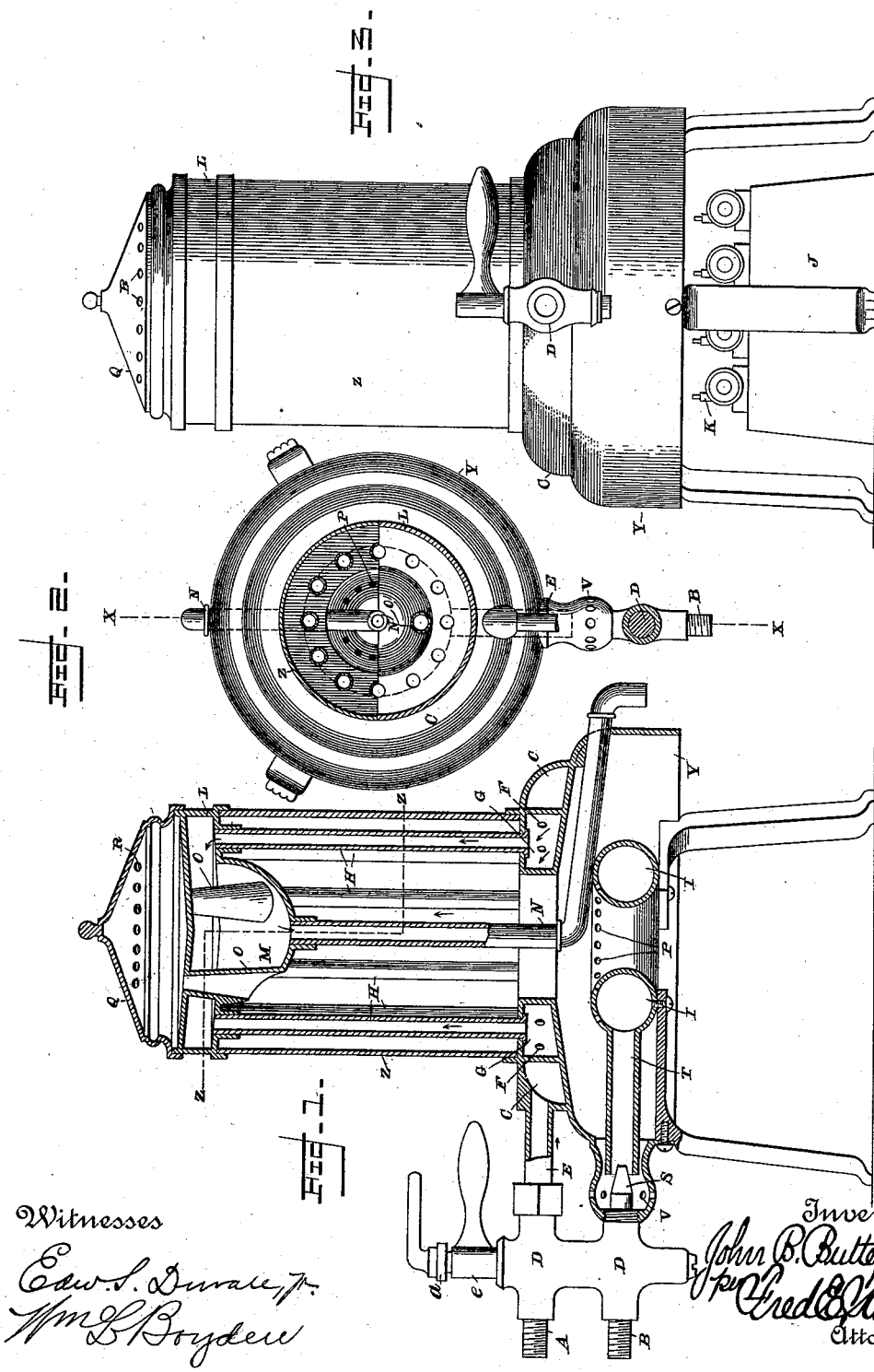
Witnesses
Edw. S. Duvall, Jr.
Wm. L. Boyden
Inventor
John B. Butterworth,
by Fred E. Tasker,
Attorney

UNITED STATES PATENT OFFICE.

JOHN B. BUTTERWORTH, OF SAN FRANCISCO, CALIFORNIA.

WATER-HEATING APPARATUS.

SPECIFICATION forming part of Letters Patent No. 506,975, dated October 17, 1893.

Application filed January 14, 1893. Serial No. 458,397. (No model.)

*To all whom it may concern:*

Be it known that I, JOHN B. BUTTERWORTH, a citizen of the United States, residing in the city and county of San Francisco, State of California, have invented certain new and useful Improvements in Water-Heating Apparatus, as set forth in the following specification and the drawings therewith, which I declare to be a full, clear, and exact description of my invention.

My invention relates to that class of apparatus whereby water is rapidly heated by means of a gas or other flame, applied in such a manner as to secure rapid and thorough convection of the heat, also a diffusion and circulation of the water heated and thus utilize in the fullest manner the heat applied.

My improvements consist in a heating apparatus with an annular inlet chamber communicating by means of a number of perforations through the inner wall of this chamber, to another annular inner chamber on the same plane, this latter chamber connecting with an upper chamber by means of connecting pipes exposed to the flame or heat, the bottom of the upper chamber being concave in the form of a bowl and having through it vent pipes to carry off the gases of combustion generated by the flame burners, also to perform in part the function of heating the water.

In the drawings hereunto annexed, Figure 1 is a vertical section taken on the line $x$ $x$, through Fig. 2, showing a water-heating apparatus constructed according to my invention. Fig. 2 is a plan view of the same apparatus partially in section, on the line $z$ $z$ of Fig. 1. Fig. 3 is an elevation of the same apparatus, provided with a lamp for heating.

Similar letters of reference are employed to designate like parts in the different figures.

Referring to Fig. 1, A is the inlet for water, and B the inlet for gas, both being controlled simultaneously by a double cock D, or by two independent cocks, as may be desired. When a double cock is employed, a second key $a$ is employed to regulate the flow of water relatively to that of gas, this key acting upon and closing the aperture through the main key $e$.

The water, after passing the cock D, flows through the pipe E into the annular chamber C, and is forced through the apertures F into a second annular chamber G, being at the same time agitated and diffused at the point where the heat is most intense. From this chamber G the water rises through the tubes H into the top chamber L, the latter having a concave or bowl-shaped bottom M from where the water is drawn off by a discharge pipe N, or by any other connection with the top chamber L as may be most convenient or desired.

Vent pipes O pass through the chamber L to permit the spent gases from the burner P to pass upward into the cover Q, through which they escape by means of suitable perforations therein, as shown at R, Figs. 1 and 3.

When gas is employed as the heating agent it enters at B, passes the cock D, nipple S, and pipe T, into the annular retort or chamber I, and escapes in flame at the perforations P, as shown in Fig. 1. From there the flame and heat first act on the agitated water in the chamber G, then on the tubes H, chamber L, and the tubes O, finally escaping at the apertures R in the cover Q.

Surrounding the tube T and nipple S is a perforated chamber V to admit air which is drawn into the tube T by induction, and mingling with the gas, constitutes what is called an atmospheric burner, increasing the intensity and heat of the flames at P.

Surrounding the central section of the apparatus, and connecting the chamber L with the main base part Y, is a cylindrical shell, or cover Z, which seems to confine the heat, and form a symmetrical exterior contour as shown in Fig. 3.

To operate the apparatus by means of a lamp, it is arranged as shown in Fig. 3, where J is a lamp and K burners, acting the same as the gas jets shown in Fig. 1.

Having thus explained the nature and objects of my invention and the manner of constructing the same, what I claim as new, and desire to secure by Letters Patent, is—

1. In a water heating apparatus, the combination of the outer and inner annular water receiving chambers, a perforated wall between them, a top chamber, the vertical tubes connecting one of the lower annular chambers with said top chamber, a perforated cover for the top chamber and vent pipes arranged within said chamber to permit the spent gases from the burner to pass upward into the cover, substantially as described.

2. In a water heating apparatus, the combination of the outer and inner annular water receiving chambers, a perforated wall between them, a top chamber, vertical tubes connecting the inner annular chamber with said top chamber, a discharge pipe leading from the top chamber and a perforated cover for said chamber, the annular gas retort I having perforations P, substantially as described.

3. In a water-heating apparatus, outer and inner annular water receiving chambers as herein described, a perforated wall between, vertical tubes connecting the inner annular chamber with a top one having a concave bottom; a discharge pipe leading therefrom, and flues passing through the body of this upper chamber, so a heating burner or lamp beneath will act upon the water in all these chambers and the vertical connecting pipes, in the manner and for the purposes substantially as described.

In testimony whereof I have hereunto affixed my signature in the presence of two witnesses.

JOHN B. BUTTERWORTH.

Witnesses:
ALFRED A. ENQUIST,
WILSON D. BENT, Jr.